R. W. THING.
Improvement in Apparatus for Boiling Bones, Refuse Meats, &c.

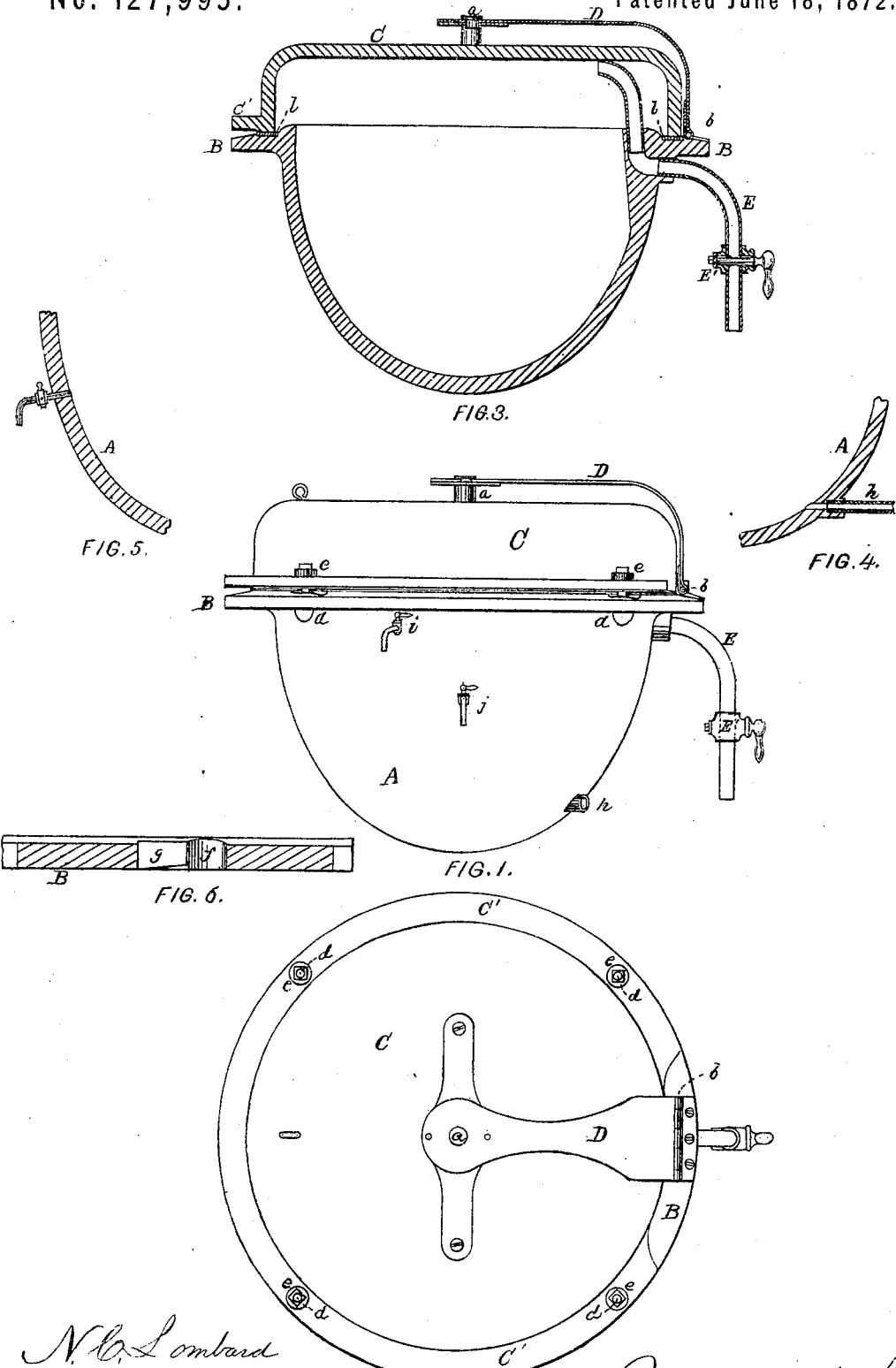

No. 127,995. Patented June 18, 1872.

WITNESSES.
N. C. Lombard
David T. Pray

INVENTOR.
Rensselaer W. Thing

127,995

UNITED STATES PATENT OFFICE.

RENSSELAER W. THING, OF WINCHESTER, MASSACHUSETTS, ASSIGNOR TO N. WARD & CO.

IMPROVEMENT IN APPARATUS FOR BOILING BONES, REFUSE MEATS, &c.

Specification forming part of Letters Patent No. 127,995, dated June 18, 1872.

Specification describing a new and useful Process and Apparatus for Boiling Bones, Refuse Meats, &c., for the purpose of extracting the oils therefrom, invented by RENSSELAER W. THING, of Winchester, in the county of Middlesex and State of Massachusetts.

The boiling of bones, dead horses, and other refuse meats for the purpose of extracting the oils therefrom, as heretofore practiced, has ever been a source of annoyance to the neighborhood for some distance around where the process is carried on on account of the foul odors with which the atmosphere is charged therefrom, and many attempts have been made to remedy the evil, with but very little success. To remedy this evil, and render the boiling of bones and refuse or other meats odorless, is the object of my invention. To accomplish this object I place the material in a steam and air tight kettle or receptacle and cook it by steam or otherwise, the odors and vapors arising therefrom escaping through a pipe provided for the purpose, the discharge-orifice of which is under water, salt-water being preferable for the purpose. A location near a large body of water is desirable, so that the escape-pipe may discharge at considerable depth below the surface and some distance from the shore, a cock in said pipe being used to control the pressure in the kettle by increasing or diminishing the size of the discharge-orifice.

In order that others skilled in the art may be enabled to practice my invention, I will now proceed to describe the apparatus by the use of which I am enabled to carry out my improved process.

Figure 7:
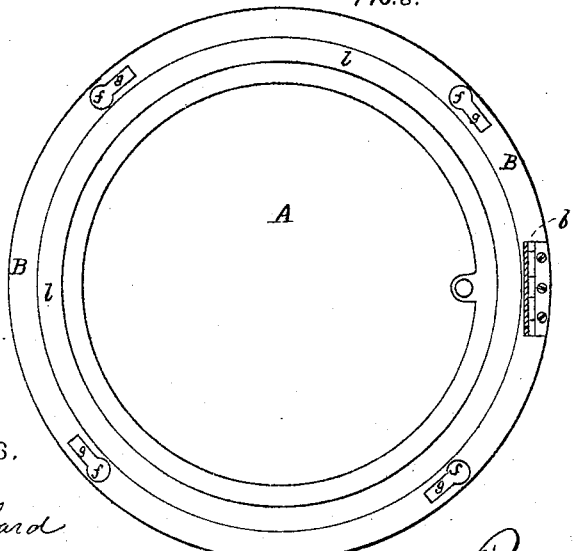

Figure 1 of the drawing is a side elevation of my improved kettle or tank. Fig. 2 is a plan. Fig. 3 is a vertical section on line $x\ x$ on Fig. 2. Fig. 4 is a section of a portion of the kettle through the center of the pipe through which steam is admitted to the kettle. Fig. 5 is a section through the center of the regulating-cock. Fig. 6 is a section of the flange of the kettle on line $z\ z$ on Fig. 2; and Fig. 7 is a plan of the kettle with the cover removed. Figs. 8, 9, 10, and 11 are, respectively, a plan and a vertical section of a modification in the manner of attaching the cover to the kettle and the belt for securing the same.

A is the kettle, having the flange B cast upon its upper part. C is the cover, pivoted at $a$ to the bracket or arm D, which is secured by the hinge-joint $b$ to the flange B of the kettle A. The cover C is provided with a flange, C′, by means of which and the bolts $d\ d$ the cover is secured to the kettle. The bolts $d$ have conical or rounded heads, and are fitted nicely to holes in the flange C′, and are adjusted by the nuts $e$. The flange B of the kettle A has holes $f$ made through it sufficiently large to allow of the free passage of the head of the bolts $d$, and curved slots $g$ extending therefrom concentric with the center of the cover of sufficient width to receive the body of the bolts $d$, the under side of the flange B, on either side of the slot $g$, being made inclined or wedge-shaped, as seen in Fig. 6. A pipe, $h$, enters the kettle near its bottom, through which steam is admitted to the kettle for cooking its contents. A cock, $i$, is inserted in the kettle near the top for the purpose of drawing off the oil or grease contained therein, and another cock, $j$, is inserted in the side of the kettle at a still lower level for the purpose of regulating the height of the liquid contained in the kettle, so as to keep the same at the proper level to admit of drawing oil or grease from the cock $i$. E is an escape-pipe, the inner end of which is turned upward to the extreme upper part of the inclosed chamber, as shown, and the portion outside of the kettle fitted with the cock E′, to control the pressure in the kettle, is carried in any desired direction some distance from the shore and several feet under water, where the odors arising from the material in the process of cooking are discharged into the water.

Figure 9:
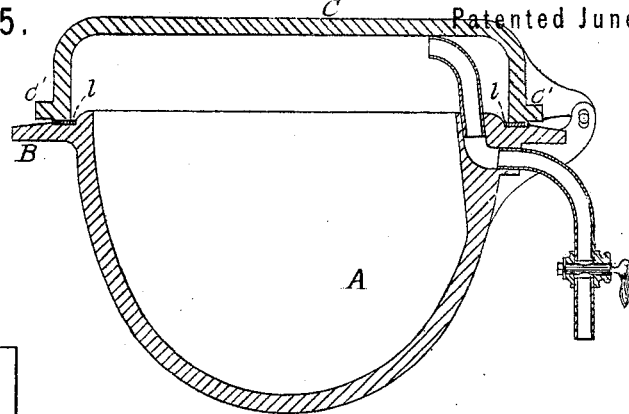
Figure 10:
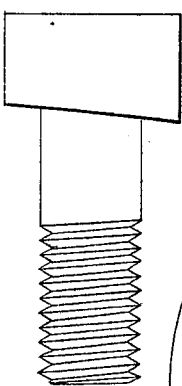
Figure 8:
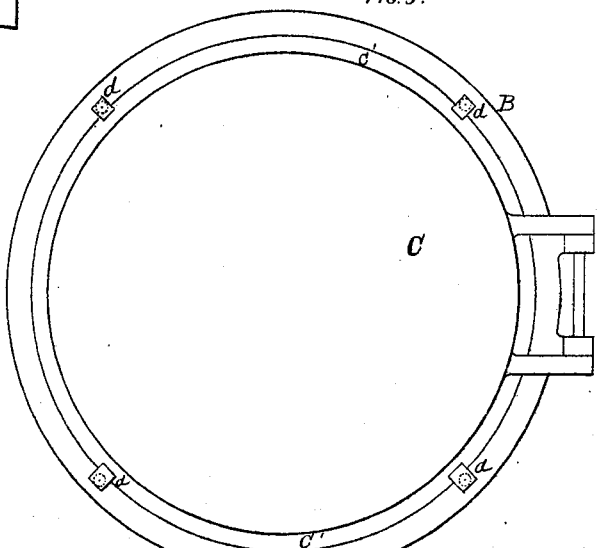
Figure 11:
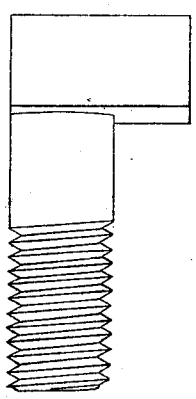

The operation of my improved apparatus and process is as follows: I place the bones, meat, or other material to be boiled in the kettle, swing down the hinged cover upon the rubber packing $l$, the rounded or pointed heads of the bolts $d$ passing freely through the holes $f$, when the cover is slightly rotated upon its central pivot until the bolts $d$ arrive at the end of the curved slots $g$, when the nuts $e$ are screwed down hard, firmly compressing the rubber packing and making a steam-tight joint. Steam is then admitted to the kettle through the pipe $h$, continuing to flow in, and condensing therein after giving out a portion of its heat to the material contained in the kettle. The water accumulating from the condensation of the steam and the addition of the grease and juices of the meat soon fill the kettle full up to the cock $i$, when the grease or oil, which rises to the top of water, may be drawn off through said cock. The kettle being steam and air tight, the odors arising from the boiling meat cannot escape, except through the pipe E, by which it is conveyed to some distance from the shore and discharged under water at such a depth that it is completely absorbed by the water instead of escaping into the atmosphere. If at any time, upon opening the cock $i$, water should flow therefrom instead of oil or grease, the cock $j$ must be opened and water drawn therefrom until the oil will flow from $i$. In this manner the fluid in the kettle may be always kept at the proper height to allow of drawing off the oil through the cock $i$. The kettle may, if desired, be heated by a fire built beneath the same, in which case the cock $j$ becomes a supply-cock instead of a draught-cock, water being forced into the kettle through the cock $j$ to supply the deficiency occasioned by the evaporation, and thus keep the liquid at the desired level to discharge the oil from the cock $i$. The cover C, instead of being pivoted by its center to the hinged bracket or arm D, may be hinged directly to the kettle, as shown in Figs. 8 and 9, the hinge being so formed as to allow of a slight vertical movement of the cover when the holding-bolts are screwed down upon the cover to bind it to the kettle to make a steam-tight joint. In this modification of the manner of attaching and securing the cover C the flange on the cover is made somewhat narrower than the flange on the kettle, and the holding-bolts are secured into the kettle-flange just outside of the edge of the cover-flange, said bolt having no head upon one side, so that when all of said bolts are turned so that the side having no head is toward the cover it may be raised up and swung back upon its hinge so as to leave the whole area of the kettle exposed for putting in or removing the material therefrom. The under side of the heads of the holding-bolts used in this modification are made slightly inclined, as shown in Fig. 10.

I am aware that steam-tight kettles or tanks have been used before with a man-hole for introducing the material and another to remove it from the kettle, and; I am also aware that kettle-covers have been hinged to kettles before, and therefore I do not lay claim, broadly, to either a hinged cover or a steam-tight kettle; but a kettle having a cover as large as the diameter of the kettle hinged thereto, so that it can be readily handled, and at the same time be secured to the kettle by means of bolts and nuts, so far as I know, is novel.

What I claim as new, and desire to secure by Letters Patent of the United States, is as follows:

1. A kettle provided with a cover pivoted by its center to an arm that is hinged to the kettle in such a manner that said cover may be raised from the kettle, swinging upon the joint of the hinge, and at the same time may be partially rotated upon its axis to bring the bolts into bearing, substantially as herein described.

2. The regulating water-cock $i$, in combination with the oil-cock $j$, arranged and operating substantially as described, for the purpose specified.

3. In combination with a steam-tight kettle, arranged for boiling bones, refuse meats, &c., by the direct application of steam to the contents of the kettle, I claim the escape-pipe E, inserted through the body of the kettle, and having its inner end turned upward to the extreme upper part of the interior of the kettle, substantially as described.

Executed at Boston this 18th day of March, 1872.

RENSSELAER W. THING.

Witnesses:
N. C. LOMBARD,
DAVID T. PRAY.